UNITED STATES PATENT OFFICE.

C. G. REINHOLD, OF MILTON, PA., ASSIGNOR TO HIMSELF AND JOHN F. SHARRETTS, ASSIGNORS TO THEMSELVES AND CLIFFORD ARICK.

IMPROVED ASPHALTIC CEMENT.

Specification forming part of Letters Patent No. 46,975, dated March 21, 1865.

*To all whom it may concern:*

Be it known that I, C. G. REINHOLD, of Milton, Northumberland county, State of Pennsylvania, have invented a new and useful Compound for the Production of Asphaltic Cement and Stones; and I do hereby declare that the following is a full and exact description of the process of manufacturing and compounding the same.

The nature of my invention consists in the use of distilled or inspissated coal-tar, which when cold will form a tough body or mass, and in compounding with it while hot certain earths, mineral substances, and concreted earthy matter, so that when cold will produce a new and useful cement or stone, as may be desired, intended as a cement to be transportable in lumps or loaves as an article of manufacture, trade, or commerce, to be used for calking ships or other water-craft, cementing cisterns, cellars, underground tile or other pipes, and the like, or intended as a stone, after being molded in any desired form, to be transportable as an article of manufacture, trade, or commerce, to be used for roofing, paving, or building purposes, substantially as hereinafter more specifically described and set forth.

To enable others skilled in the art to make and use my invention, I will proceed to describe the mode of compounding and using the same.

First, I boil in iron kettles any desired quantity of coal-tar until it is distilled to such a degree that it will, when cold, form a tough body or mass; second, I pulverize in any desired quantity any calcareous earth or analogous substances, such as plaster-of-paris, brick, clay, lime, Roman cement, or the like; third, I pulverize in any desired quantity plumbago or other analogous substance; fourth, I prepare in any desired quantities pebble-stones, sand, crushed stone, crushed granite, or other concreted earthy matter; fifth, I then combine the pulverized calcareous earths, or any one of them, with the plumbago or concreted earthy matter, all or any two of them, which are to be well intermingled when ready for use, in the proportions and in the way and manner hereinafter more particularly described. I thus provide suitable molds for the formation, in such size and shape as may be desirable, of the lumps or loaves of cement or the blocks or plates of stone which I design to manufacture. I then intermix any of these separate substances or combined formations with the distilled or inspissated coal-tar, while yet in the kettles and hot, in such proportions as I may desire, having reference to the article I design to produce, as hereinafter more particularly described and set forth. This intermixture is allowed to slowly boil for about one half of one hour, and proceeds under a continual stirring with an iron or other suitable stirrer. It is then withdrawn from the kettles in any suitable manner, and is poured or pressed while hot into the molds, which have been provided as stated. After this mass has cooled the lumps or loaves of cement or the slabs or blocks of stone, as the case may be, are taken out of the molds and are ready for transportation and use. By exposure to the air these slabs or blocks will increase continually in hardness and strength, and the lumps or loaves of cement may be transported wherever desired, and be again melted and applied in a hot state to any desired use, and will be found especially valuable when applied to the seams of newly-built or old ships or other watercraft, rendering them perfectly impervious to water. By its use oakum may be entirely dispensed with, as it will be found to penetrate the smallest openings of the wood and to adhere much more tightly to its surface than the best pitch does or can. It will also be found to be highly preservative of wood, iron, or stone when submerged or embedded in the earth.

As to the proportions in which I compound inspissated coal-tar with these substances any one of these pulverized calcareous earths in about the proportions of half and half will produce a desirable cement; but a different proportion with a percentage of plumbago will be found to secure better results; and, as a distinct formula for the best result, according to my experience, I take for this purpose, for every gallon of inspissated coal-tar, a well-intermingled mixture composed of one pound of any one of the pulverized calcareous earths and one-half of a pound of pulverized plumbago or other analogous substances, and this mixture I boil and intermingle with the coal-tar in the manner described, and when done transfer it to the molds, as stated; or to secure another result, for every gallon of the inspissated coal-tar I take, say, six pounds of either of the pulverized calcareous earths, one pound of pulverized plumbago, and three pounds of sand or crushed granite or other concreted earthy matter. These, well mixed, I boil and intermingle with the coal-tar in the same manner, and when done is molded or pressed, while hot, into any desired form adapted to tiling, roofing, flooring, paving, building, or other uses. A mixture, one-half of pulverized clay and equal parts of lime and sand, or one-third of each, well mixed, and then stirred into the inspissated coal-tar until it shall be stiffer than mortar, or as long as it can well be worked, will produce a mass, to which if you add half and half as to bulk, clean gravel, powdered granite, or hard stone, we will obtain, when cool, excellent paving-stones.

I do not limit or confine myself to the precise proportions indicated in the use of these materials for the purposes described, as it is evident they may be varied according to circumstances, in view of the different uses for which the manufacture is intended; nor do I claim the use of coal-tar, or pulverized calcareous earths, or plumbago, or concreted earthy matter, furnace-cinders, sand, and the like in the formation of cement or stones; but, Having described my invention, what I do claim as new and useful, and desire to secure by Letters Patent, is—

1. The use of distilled or inspissated coal-tar secured by the process of boiling, which, when compounded with a calcareous earth while hot, may be reduced to lumps or loaves of cement, substantially as and in the manner and for the purposes described.

2. Combining with these pulverized earths plumbago for the purpose of uniting the same, when combined with inspissated coal-tar, reducible to lumps or loaves of cement when cold, substantially as and in the manner and for the purpose described.

3. Combining with these pulverized earths pebble-stones, sand, crushed stone, granite, or other concreted earthy matter, for the purpose of uniting the same when combined with distilled or inspissated coal-tar, reducible to slabs or blocks of stone when cold, substantially as and for the purpose described.

4. Combining with these pulverized earths, pebbles, sand, crushed stone, or other concreted earthy matter, as described, plumbago or other analogous substance, for the purpose of uniting the same when combined with inspissated coal-tar, reducible to slabs or blocks of stone when cold, substantially as and for the purpose described.

5. An article of manufacture, trade, or commerce, the said "asphaltic cement," compounded and manufactured as described, when reduced to lumps or loaves, as set forth.

6. An article of manufacture, trade, and commerce, the said asphaltic stones, compounded and manufactured as described, when reduced to any desired form and size, substantially as and for the purpose described.

C. G. REINHOLD.

Witnesses:
JOHN F. WOLFINGER,
P. L. HACKENBERG.